UNITED STATES PATENT OFFICE.

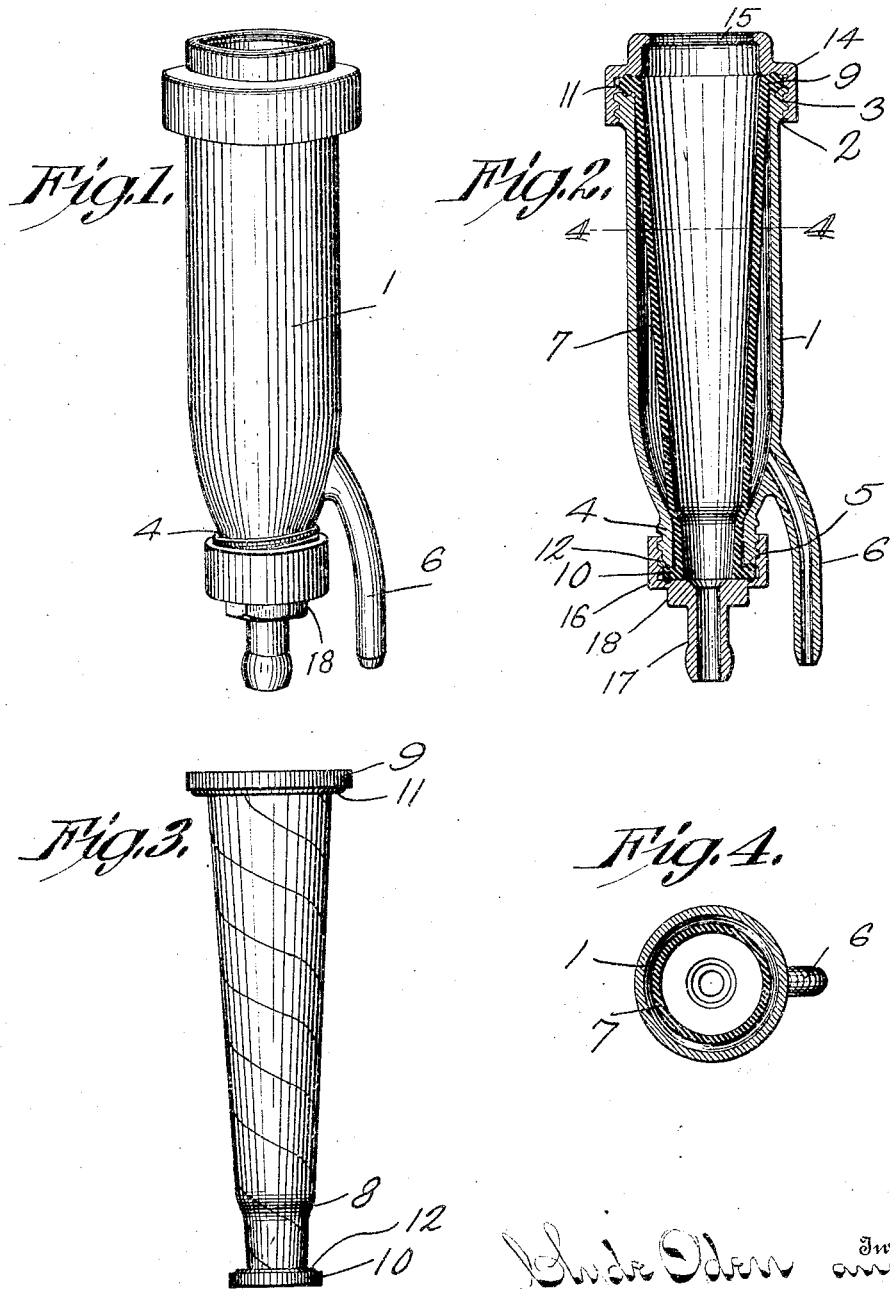

CLYDE ODEN AND JOHN G. G. EKLUNDH, OF COLUMBUS, OHIO, ASSIGNORS TO THE UNIVERSAL MILKING MACHINE COMPANY, A CORPORATION OF OHIO.

TEAT-CUP.

1,287,404.

Specification of Letters Patent.

Patented Dec. 10, 1918.

Application filed June 12, 1917. Serial No. 174,216.

*To all whom it may concern:*

Be it known that we, CLYDE ODEN and JOHN G. G. EKLUNDH, citizen of the United States and subject of the King of Sweden, respectively, residing at Columbus, in the county of Franklin and State of Ohio, have invented certain new and useful Improvements in Teat-Cups, of which the following is a specification.

My invention relates to milking apparatus and more particularly to teat cups therefor of the intermittently inflated or pulsating type.

The object of the invention is to improve the structure as well as the means and mode of operation of such devices whereby they will not only be cheapened in construction, but will be more efficient in use, positive in operation, uniform in action, and unlikely to get out of repair.

A further object of the invention is to provide a teat cup which will be universal in its application to teats of varying lengths and diameters, whereby the same cup may be used for different cows regardless of the relative size of the teats.

A further object of the invention is to provide a flexible lining or filler which will be uniform in its operation contracting substantially uniformly throughout the periphery, and which will be unlikely to crack or split under the influence of continued vibratory movement.

A further object of the invention is to provide a flexible lining or filler in which the tendency to wrinkle transversely will be obviated, and the un-uniform distortion under varying internal and external pressure will be reduced to minimum.

A further object of the invention, but by no means of less importance, is to provide improved means for connecting the filler or lining with the housing.

With the above primary and other incidental objects in view as will more fully appear in the specification, the invention consists of the features of construction, the parts and combinations thereof, and the mode of operation or their equivalents, as hereinafter described and set forth in the claims.

Referring to the drawings Figure 1 is a perspective view of the assembled teat cup forming the subject matter hereof. Fig. 2 is a longitudinal vertical sectional view thereof. Fig. 3 is a side elevation of the flexible lining or filler removed from the housing. Fig. 4 is a transverse sectional view on line 4—4 of Fig. 2 looking downward.

Like parts are indicated by similar characters of reference throughout the several views.

The teat cup forming the subject matter hereof is of that type in which a vacuum or suction is constantly maintained upon the interior of the flexible lining comprising the suction chamber and upon the teat contained therein, while air is alternately admitted and exhausted from the housing about the exterior of said flexible lining or filler causing the lining alternately to contract and expand or vibrate. The pulsation or alternation of the expansion and contraction of the lining or the filler occurs in rapid succession, usually varying approximately from forty-eight to sixty times per minute, and affords a massaging action upon the teat which tends not only to induce and accelerate the flow of milk but also to return upwardly to the udder the blood drawn into the teat by the suction or vacuum action thereby avoiding congestion.

Referring to the drawings, the teat cup forming the subject matter hereof, includes a cylindrical housing tapering somewhat at its lower end and about its upper edge an externally threaded collar or flange 2 is provided. The terminal face of the collar or flange 2 contains a groove or recess 3. The housing 1 is also provided at its lower or smaller end with a similar screw-threaded collar 4 and in its terminal face a shallow concentric groove or channel 5.

Communicating with the interior of the housing 1 is a branch conduit or extended nipple 6 which is connected through a pulsator or other variable control means with a suitable suction device or vacuum pump. The pulsator or air control means alternately opens the conduit 6 to atmosphere, and closes it against atmosphere and opens it to the action of the suction device of the vacuum pump. The influence of the latter is extended to the exterior of the flexible lining or filler to effect the pulsating action. It is to be understood however that the teat cup forming the subject matter hereof is not limited to use with any particular pulsator, but may be employed in conjunction with various pulsators and control means for alternately admitting and exhausting air through the conduit as are now commonly used for this purpose. While the concentric grooves or channels 3 and 5 in the terminal faces of the housings are desirable it is to be understood that they are not essential but may be omitted if so desired.

The flexible lining or filler is an elongated tubular body of rubber, impervious fabric, composition or other flexible yielding material either reinforced or without reinforcement according to the nature of the material and the conditions of its use. As shown in Figs. 2 and 3, this tubular body 7 is of continuous or uniformly tapered or conical form throughout the greater portion of its length. In the drawing the tapered form has been shown slightly contracted at its lower end to fit the housing as indicated at 8. At each end the tubular body 7 is formed with an external peripheral flange or collar 9 and 10 which extend beyond the ends of the main housing 1 and overhanging the screw threaded collars 2 and 4. The tubular portion of the filler intermediate the flanges 9 and 10 is substantially equal in length to the length of the housing 1 whereby the external terminal flanges of the lining or filler will be caused to seat firmly upon the terminal faces of the housing. The lining flanges 9 and 10 are preferably though not necessarily provided upon their inner or adjacent faces with concentric beads 11 and 12 to be seated within concentric grooves or channels 3 and 5. While approximately accurate proportions of the lining and housing are to be desired, neither slight excess or deficiency in length will defeat the operation or purpose of the lining, inasmuch as any variation of the size within reasonable limit will be compensated for by the elasticity and flexibility of the tubular lining or filler body. It is to be noted that the contraction of the filler body before mentioned which is comparatively slight, occurs at the point where the tapered filler or lining meets the interior wall of the housing at its lower end and such contraction insures a perfect contact or fit of the lining or filler in the inner end of the housing. By reference to Fig. 2 it will be noted that the effective length of the tubular conical lining or the filler is substantially uniformly tapered throughout. It extends in a straight line from its point of contact with the housing at one end to its point of engagement at the other end. The contracted neck is not a part of the vibratory body but a part of the connecting portion only. One of the advantages of the uniformly tapered construction is that it facilitates the manufacture of these linings or fillers by enabling the material while in the form of a strip to be wrapped spirally about an internal form or mandrel during the process of manufacture. This construction not only enables the linings or fillers to be more economically manufactured, but it enables the manufacture of a lining or filler having greater durability and strength, less likely to split or crack while in use and possessing less tendency to wrinkle or crease either transversely or vertically. The spiral wrapping of the lining or filler material about the mandrel or form during process of manufacture distributes the stresses and strains to which it is subjected in operation more uniformly throughout the lining body. It tends to distribute the grain of the material, or strands of the reinforcement if employed, in directions transversely to the usual lines of cleavage or breakage, thereby increasing the life and durability of the flexible lining or filler body.

As before stated it is desirable that the lining or filler body be accurately proportioned to the housing whereby it will be maintained in a state of neutral suspension, neither subjected to a stretching tension nor possessing undue degree of slack or excess of material. It will be understood however that after long periods of use the filler or lining may accumulate some slack incident to the stretching of the material while in operation.

In assembling the device the small end of the filler or lining is introduced into the central housing 1, and passed through the central housing 1, and passed through the smaller end of the housing. The passage of the flange 10 through the opening is facilitated by the use of a special instrument inserted through said opening or more conveniently by means of a string which may be looped or otherwise engaged about the filler immediately above the flange 10 by which the flange may be drawn through the opening after which the string is disengaged.

In the adjusted position of the filler or lining 7 the flanges 9 and 10 thereof engage upon the terminal faces of the housing 1 with the beads 11 and 12, if such beads are provided, seated within the concentric grooves or channels 3 and 5. The upper end of the lining or filler is secured in position and the flange 9 thereof is placed under compression to hermetically seal the variable pressure chamber 13 surrounding the filler 7 within the housing 1 by means of a cap 14, screw threaded upon the housing flange 2 and having a central orifice 15 for the reception of the teat. This compression cap 14 bears upon the external flange 9 of the lining or filler and presses it within the annular groove or channel 3. At its lower end the filler is similarly engaged with the housing by means of an internally threaded cap 16 which engages the external threaded collar 4 of the housing 1, and bears upon the terminal flange 10 of the filler which is thereby compressed into the annular groove or channel 5 of the housing. The cap or compression head 16 carries an integral nipple or conduit 17 having a central bore which communicates with interior of the lining or filler 7 which comprises the suction chamber.

In practice this nipple 17 is connected by a flexible conduit with the pail or milk receiver which is in turn connected with the suction device or vacuum pump. Inasmuch as compression cap 16 may not be readily grasped and turned on account of the proximity of the conduit 6 this compression cap may be provided with a hexagonal boss or collar 18 or one of the other polygonal shape for engagement of a wrench or spanner.

Whereas it has been heretofore customary to form the flexible filler or lining of teat cups of this character substantially cylindrical throughout the major portion of their length and abruptly contracted at their lower ends, whereby the teat operated upon normally hangs loosely within the filler or lining and out of contact with the flexible walls thereof, it has been found in practice that the continuous tapered form of the filler or lining as herein shown and described, affords greater efficiency. In the use of the present form of device the pendant teat normally contacts the flexible walls whereby there is less lost motion in the vibration of the filler or lining, the teat being subjected to a continuous massaging action throughout the entire operation. It has been found in practice that cows generally recognized as hard milkers respond more generously to the tapered filler or lining forming the subject matter hereof than they do to the ordinary cylindrical lining heretofore commonly used. Not only is the response more prompt and generous but it has been found that with the use of the continuously tapered filler or lining as herein described, hand stripping after the use of this teat cup becomes unnecessary.

From the above description it will be apparent that there is thus provided a device of the character described, possessing the particular features of advantage before enumerated as desirable but which obviously is susceptible of modification in its form, proportion, detail construction or arrangement of parts, without departing from the principle involved or sacrificing any of its advantages.

While in order to comply with the statutes, the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described our invention, what we claim is:—

1. A teat cup for milking apparatus comprising a rigid tubular housing having a reduced orifice at one of its ends and externally screw threaded at both its ends; a tapered flexible tubular filler extending through said housing, a reduced neck at one end of the filler adapted to extend through the reduced orifice of the housing, peripheral flanges on the opposite ends of said filler tube projecting beyond and overhanging the ends of the tubular housing, and compression caps screw threaded upon both ends of the housing over the protruding flanges of the filler.

2. A teat cup for milking apparatus, comprising a tubular housing, contracted at its lower end, and a flexible tubular filler within said housing having a substantially straight uniform taper from the upper end of said filler to its point of engagement with the contracted end of the housing, and means for securing said filler in position.

3. A teat cup for milking apparatus comprising a tubular housing, a tubular filler within the housing, the material forming the walls of said tubular filler being extended spirally throughout the length of the filler, and means for connecting the filler to the housing.

4. A teat cup for milking apparatus including a housing, and a flexible filler within said housing formed by wrapping filler material spirally around a mandrel and uniting said wrappings one with the other, and means for engaging the filler with the housing.

5. A teat cup for milking apparatus, comprising a tubular housing having a reduced orifice at one end thereof, a tubular filler within the housing of substantially uniformly tapered shape having a neck portion to engage in the reduced orifice of the housing, external marginal flanges at opposite ends of said filler, and means for engaging said terminal flanges with the housing.

6. A teat cup for milking apparatus comprising a tubular housing, screw threaded at its opposite ends, a screw threaded internally flanged collar fitted to one end of said housing, an internally screw threaded cap having an integral nipple projecting therefrom fitted to the opposite end of the housing, and a flexible tubular filler within the housing, a permanently formed peripheral flange at each end of the filler, one of which is clamped between the flange of said collar and the end of the housing, and the other is clamped between the cap and the other end of the housing.

In testimony whereof, we have hereunto set our hands this 7th day of June, 1917.

CLYDE ODEN.
JOHN G. G. EKLUNDH.

Witnesses:
H. J. OSSING,
GEORG VOIT.